United States Patent
Delamere

[15] 3,650,030
[45] Mar. 21, 1972

[54] CHEESE MOLD

[72] Inventor: Richard William Delamere, Peterborough, Ontario, Canada

[73] Assignee: De Laval Company Limited, Peterborough, Ontario, Canada

[22] Filed: Feb. 4, 1970

[21] Appl. No.: 8,561

[52] U.S. Cl. ............................ 425/408, 249/112, 425/450
[51] Int. Cl. .......................................................... A01j 25/13
[58] Field of Search ................. 31/44, 7; 249/168, 113, 112, 249/141

[56] References Cited

UNITED STATES PATENTS

| | | | |
|---|---|---|---|
| 3,095,647 | 7/1963 | Rossen | 31/44 |
| 2,193,013 | 3/1940 | Weinberg | 31/44 |
| 3,118,229 | 1/1964 | Rossen | 31/44 |

Primary Examiner—Aldrich F. Medbery
Attorney—Davis, Hoxie, Faithfull & Hapgood

[57] ABSTRACT

Upper and lower receptacles adapted to define a mold cavity are duplicates of each other so that they are interchangeable. Releaseable means support a sleeve in the lower receptacle above its bottom and with the upper portion of the sleeve adapted to protrude into the upper receptacle to space the latter vertically from the lower receptacle; and after filling the lower receptacle and this sleeve protrusion with the cheese curd and then applying the upper receptacle, the supporting means are released so that the sleeve slides toward the bottom of the lower receptacle as the curd-pressing operation forces the upper receptacle downward relative to the lower one. Handle members integral with the receptacles serve to reinforce their side walls.

8 Claims, 7 Drawing Figures

PATENTED MAR 21 1972 3,650,030
SHEET 1 OF 3
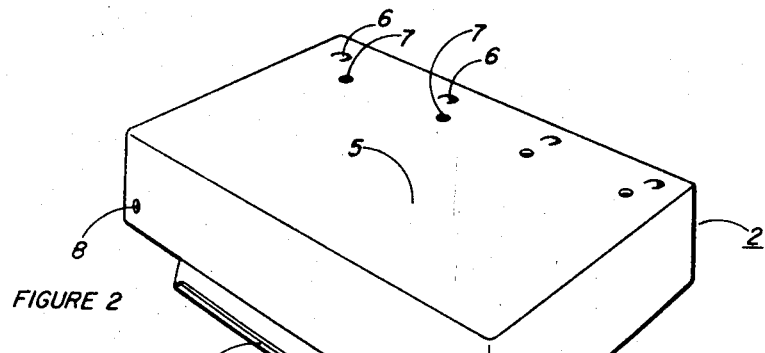
FIGURE 2
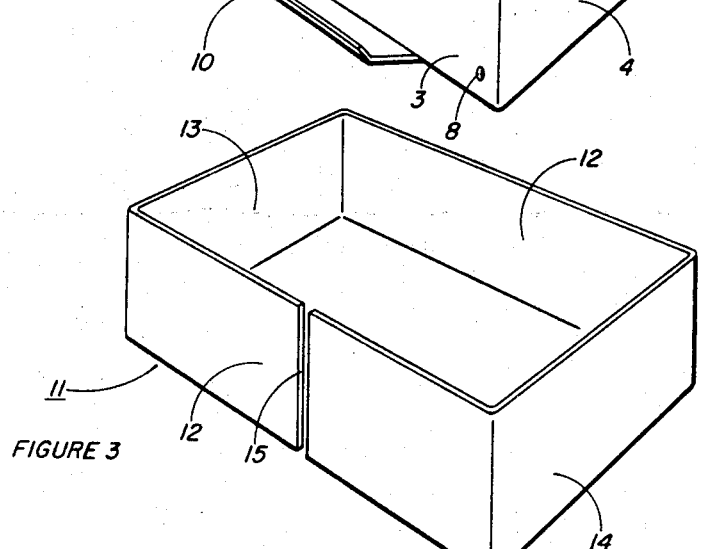
FIGURE 3
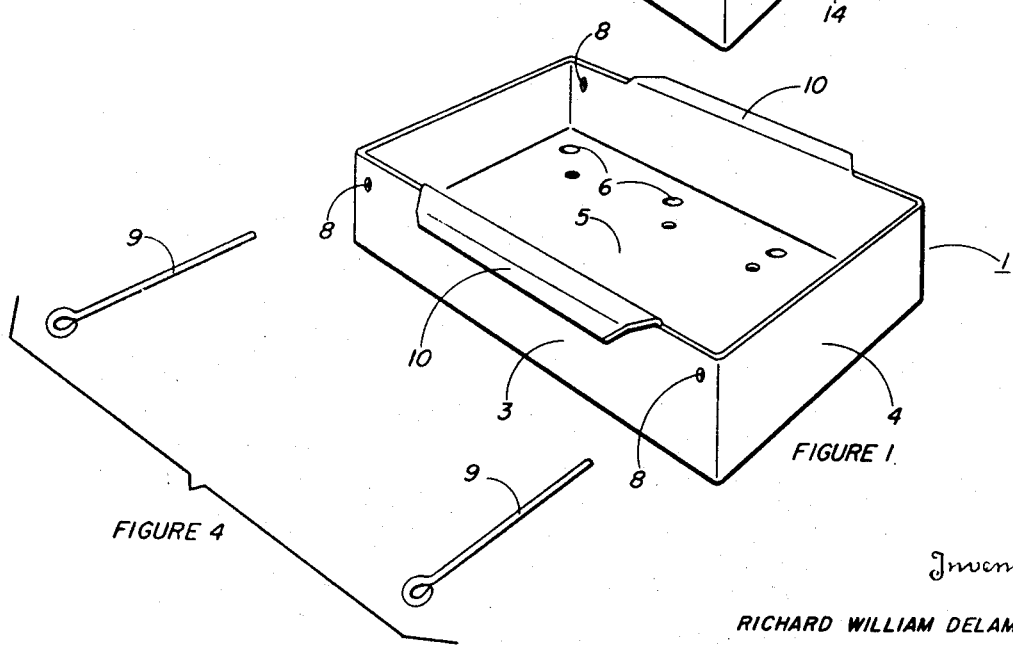
FIGURE 1
FIGURE 4
Inventor
RICHARD WILLIAM DELAMERE
By Davis, Hoxie, Faithfull & Hapgood
Attorneys

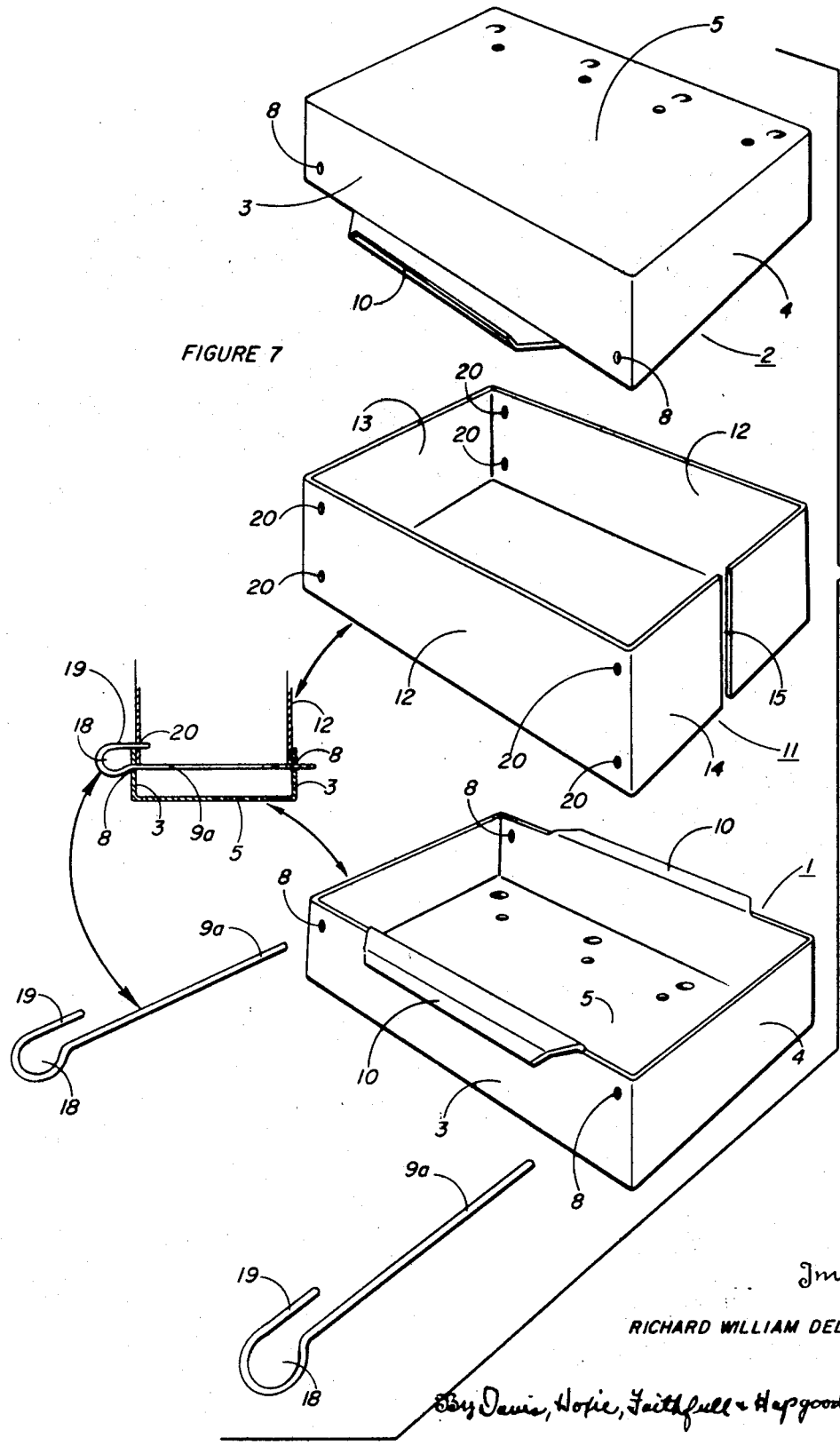

CHEESE MOLD

The present invention relates to a novel cheese mold of preferably rectangular structure which differs from conventional structures in having top and bottom mold-defining sections that are identical in structure and interchangeable. The mold also includes a liner section that is adapted to be slidably contained within top and bottom sections when they are mounted in opposed or molding relation. The invention also relates to the several elements that are to be assembled to form the mold.

In conventional cheese molds, the top and bottom portions are not identical in structure, the bottom portion usually being a relatively deep container designed to receive a liner member. With the liner in place, the bottom section is filled with unpressed cheese curd, the top section or portion is then placed thereon and pressure applied to the mold to expel the whey from the curd. The top section in heretofore known molds is a shallow lid or cover that is placed over the curd container after filling and before the pressing operation. Conventional molds frequently bulge and produce cheese blocks that are not uniform, covers may slip off or be removed accidentally, filled molds are in many cases awkward to handle, and following cleaning and washing, top and bottom sections must be sorted and rematched for future use.

With the mold of the present invention, because the top and bottom sections are identical, bulging is materially reduced and there is greater uniformity of the resulting rectangular cheese blocks, the section forming the cover cannot be removed accidentally, the generous hand-grips that are provided materially facilitate handling of the filled molds, and there is no need to sort top and bottom sections following washing.

It is an object of the invention to provide principal mold defining sections or receptacles that are identical in structure and that may be interchangeably mounted in inverted relation to define a mold cavity.

It is another object of the invention to provide molding apparatus wherein the volume of the lower half of the mold may be temporarily increased, during addition of unpressed curd to the mold.

The invention may be defined as a cheese mold, or as apparatus for use in assembling a cheese mold, comprising identically constructed and interchangeable upper and lower sections or receptacles, each having paired side and end walls and a single receptacle defining wall formed unitary with the side and end walls. The receptacles are mounted in pairs, one above the other, in inverted relationship, to define a mold cavity, one serving as the bottom and the other the top of the mold. A sleeve may be slidably mounted within the receptacles and may be temporarily suspended within the bottom receptacle or section, by means of removable pins, in order to increase the volume of that section temporarily during the loading of unpressed curd into the mold, there being handle members formed integral with the side walls of the receptacles, the handles also serving to reinforce the sides of the mold in order to minimize bulging during the pressing operation.

The invention will be described with reference to the accompanying drawings in which FIG. 1 is a perspective view of one of the sections or receptacles positioned to serve as the bottom of the mold;

FIG. 2 is a similar view of another of the receptacles in inverted or cover position;

FIG. 3 is a similar view of a split liner for the mold;

FIG. 4 is a similar view of a pair of liner-supporting pins;

FIG. 7 is an exploded view of the various component parts of a cheese mold according to the present invention showing a further arrangement including liner supporting pins having an open loop at one end of special configuration adapted to releasably secure the liner within the walls of a lower mold section.

Figure 5:
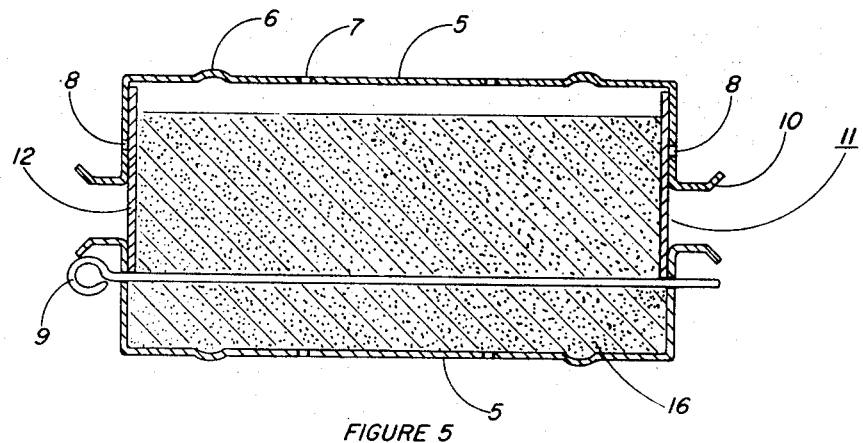
FIG. 5 is a vertical sectional view showing the liner resting on the mold pins following the pouring of the curd.

The outer mold sections or receptacles shown as the top and bottom of the mold in FIGS. 1 and 2, respectively, are identical in structure and interchangeable, the bottom receptacle being designated as 1 and the top as 2, each receptacle having side walls 3, end walls 4 and a bottom or top wall 5, the wall 5 being formed unitary with or serving to unite the side and end walls. Each wall 5 is provided with several rows of outwardly protruding dimples 6, on which the receptacle rests when it forms the bottom of the mold, and is additionally provided with rows of small drainage holes 7 to facilitate removal of the whey.

Small apertures 8 are located in the end portions of each of the side walls 3 and are adapted to receive the mold pins 9, each of the mold pins being longer than the width of the mold.

Each of the sections or receptacles 1 and 2 has handle members 10 formed integral with each of the side walls 3. As shown in connection with receptacle 1 (FIG. 1), the handle portions curve outwardly and downwardly away from the side walls and are sufficiently large to enable them to be grasped easily when the filled molds are being handled. The members 10 also serve to reinforce the side walls and aid in preventing bulging of the mold during the pressing operation.

A liner or sleeve 11 is shown in FIG. 3 and has side walls 12, and end walls 13 and 14, the liner perimeter defined by the walls 12, 13 and 14 being split at one place over its entire height as shown at 15. The liner has no top or bottom wall and is adapted for a snug, freely-slidable fit within either of the mold sections 1 and 2. Its overall depth is slightly less than the combined depths of the sections 1 and 2.

As stated above, the assembled mold is preferably rectangular in shape and the sections thereof are dimensioned most commonly to hold 40 pounds of cheese when the cheese is in the pressed condition. It will be understood, of course, that when the mold is filled with unpressed curd, the volume required for that form of curd is considerably greater than that needed for the dewheyed curd following the pressing operation, and it will be obvious that the mold section 1, which is shown as forming the bottom portion of the complete cheese mold in the accompanying drawings, will not by itself hold the quantity of unpressed curd required to provide a 40 pound cheese block in the pressed state.

In use, the sleeve 11 is inserted into mold section 1 prior to the filling of the mold with unpressed curd but, before the sleeve is placed in the mold section, the pins 9 (FIG. 4) are inserted transversely of the mold section, through oppositely-situated apertures 8 in the side walls 3. The sleeve may then be placed on and will be supported by the pins and, in that position, extends above the side and end walls of the mold section as shown in FIG. 5, thus providing the additional height to receive the required volume of unpressed curd.

The mold section 1 with the sleeve 11 in position on pins 9 is filled with wet curd to a predetermined level, or to a predetermined volume, to give a desired weight of the cheese block after pressing. The cover mold section 2 is then placed in inverted position over the top edges of the sleeve 11, thus providing a closed container for the unpressed curd. The pins 9 are then removed in order that the sleeve 11 may be free to drop down into the mold section 1. The thus filled cheese mold is then placed in a cheese press and pressure applied in order to expel the whey from the curd and, at the same time, press the curd into a resultant cheese block of the desired weight in accordance with the mold being used.

The mold sections 1 and 2 are so dimensioned with respect to total volume that, at the completion of the curd pressing operation, that is, when the assembled mold containing the curd is under a final pressure, there is a minimal gap between those sections. With conventional and heretofore known molds, the corresponding gap between the large lower section and the shallow lid or cover is generally greater than ¼ inch and the mold is frequently bulged when under such a pressure with the result that the molded cheese blocks are not uniform in shape.

With the present mold, the aforementioned undesirable bulging of the sleeve walls and the assembled mold side walls is prevented for several reasons. In the first place the gap separating the mold sections prior to the pressing operation is reduced to a practical minimum; secondly, the bulk of the pressed cheese is contained and equally distributed within a mold made up of two identically dimensioned parts whereas in conventional molds substantially the entire body of cheese curd is wholly contained within the lower of the mold sections and the split sleeve; thirdly, the handles 10 formed integrally with the two relatively longer side walls 3 of the mold sections provide extra reinforcement for those side walls of these mold sections.

The depth of the sleeve 11 of the mold according to the present invention is less than the final height of the pressed cheese block (also less than the combined height of the end and/or side walls of the bottom and top mold sections 1 and 2), and for that reason the bottom edges of the walls of the sleeve 11 are never subjected to counter-pressure by the lower mold section 1 during the pressing operation.

Figure 6:
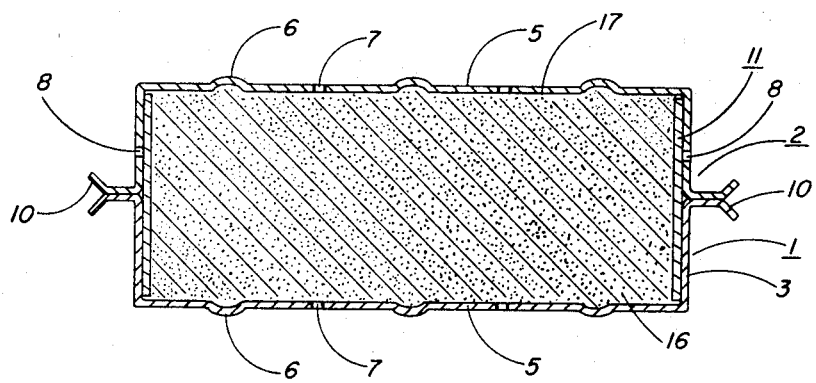
FIG. 6 is a vertical sectional view of a complete mold filled with pressed curd.

A mold in the pressed state is shown in FIG. 6, the cheese being designated as 16. The figure also locates at 17 a covering material which may be cheese cloth and which is, of course, placed within the mold prior to the filling operation.

In FIG. 7, the cooperation of the top and bottom mold sections, the sleeve, and a modified form of sleeve-supporting pins 9a is illustrated. In this arrangement, each of the pins 9a is formed with an open end loop 18, and a short section 19 thereof extends backwardly and parallel to the main body of the pin. With this modified arrangement of the assembled mold according to the present invention, suitably located and arranged holes 20 are provided in the sleeve 11 and the so formed pins 9a are first inserted through holes 8 in the bottom mold section to support the sleeve 11 as before described, the short straight section 19 of each pin 9a remaining outside of the periphery of walls 3 of the bottom mold section 1. After the sleeve 11 has been placed on the pins 9a, the pins are pushed further inwardly through the walls 3 of the bottom mold section and the section 19 of each of the pins will pass through an aligned hole 20 in the sleeve, thereby releasably locking the sleeve 11 in position within mold section 1 until such time as the pins 9 are removed in the overall cheese block molding procedure previously described.

I claim:

1. In a cheese mold, the combination of upper and lower receptacles engageable with each other to define a mold cavity, said receptacles duplicating each other dimensionally whereby they are interchangeable, a sleeve sized to extend along the periphery of said cavity and slidable vertically within said lower receptacle, said sleeve being of a height only slightly less than the height of said mold cavity at its periphery and defining a sleeve height substantially double the depth of each of said receptacles at its periphery, means for releasably supporting the sleeve in the lower receptacle above the bottom thereof and with the upper portion of the sleeve protruding into said upper receptacle to maintain the receptacles vertically spaced from each other, said supporting means being operable to release the sleeve for downward movement in the lower receptacle, and handle members on said receptacles.

2. The combination according to claim 1, in which each receptacle includes paired side and end walls and a single receptacle-forming wall unitary with said side and end walls, said bottom of the lower receptacle being constituted by a said single wall.

3. The combination according to claim 1, in which said sleeve is split vertically.

4. The combination according to claim 1, in which each receptacle includes a pair of substantially opposed walls having apertures therein, said supporting means including pins mountable in said apertures.

5. The combination according to claim 4, in which each pin includes an open end loop, one end of the loop having a relatively long section adapted to extend from one to the other of said walls while mounted in corresponding apertures therein, the other end of the loop having a relatively short section, said sleeve having a wall provided with a hole for releasably receiving said short section when the long section is thus mounted.

6. The combination according to claim 2, in which said single receptacle-forming wall has a dimpled surface and includes drainage holes.

7. The combination according to claim 1, in which said handle members are integral with the receptacles and are positioned on side walls thereof to reinforce said walls.

8. The combination according to claim 1, in which the receptacles and sleeve are rectangular in configuration.

* * * * *